April 1, 1969  F. H. GARDNER  3,435,677
SYSTEM FOR MEASURING DIRECTION AND VELOCITY OF CURRENTS
IN A LIQUID MEDIUM
Filed April 3, 1967  Sheet 1 of 2

*INVENTOR.*
FREDERICK H. GARDNER
BY Robert D. Rogers
ATTORNEY 3,435,677
SYSTEM FOR MEASURING DIRECTION AND
VELOCITY OF CURRENTS IN A LIQUID
MEDIUM
Frederick H. Gardner, Long Beach, Calif., assignor to
North American Rockwell Corporation, a corporation
of Delaware
Filed Apr. 3, 1967, Ser. No. 628,015
Int. Cl. G01w 1/02
U.S. Cl. 73—189          10 Claims

ABSTRACT OF THE DISCLOSURE

A plurality of sensor elements, each including receivers for receiving acoustic signals generated by transmitters on each of the elements, including digital data processing circuitry for computing the frequency change of signals transmitted between sensors and for generating output signals indicating the direction and velocity of ocean currents. The system includes circuitry for providing a reference plane for the sensor elements so that the output direction and velocity are oriented to the reference plane or to an earth fixed reference.

BACKGROUND OF THE INVENTION

Field of the invention

The invention relates to a system for measuring the direction and velocity of currents in a liquid medium, and more particularly, to such a system wherein the direction and velocity are measured by comparing changes in frequency of signals between sensors which are selectively spaced apart and submerged in the medium.

Description of prior art

The inventive system described herein is based on fundamental Doppler principles. The purpose of the system is to acquire measurements of two independentt ocean parameters, the current vector, and the velocity of sound in the medium (sea water). An acoustic signal can be injected into the medium as it flows through a simple tubular assembly immersed in the medium (see Kritz, Patent No. 2,826,912). The signal is injected by means of a source element at one end of the tubular assembly and picked up at the other end by a detector element.

If the displacement of the detector element from the source element is accurately known, the propagation of the signal down the tube (thus the velocity of sound and the medium) is determinable. With a stationary sensor element placed in a moving medium, the measured velocity would represent the net sum of the velocity of sound in the medium ($V_s$) and the relative velocity of the medium with respect to the sensor ($V_m$) according to the Doppler principle.

By proper design the source and receiver elements can be used interchangeably. The following equations can be written to describe the directions of the audio signals through the medium, $$V_1 = V_s + V_m$$
$$V_2 = V_s - V_m$$

where $V_1$ is equal to the measured velocity in one direction and $V_2$ is equal to the measured velocity in the other direction.

By adding and subtracting the equations, the following equations can be derived, $$V_s = \frac{V_1 + V_2}{2}$$

$$V_m = \frac{V_1 - V_2}{2}$$

By using the above equations, either one or both of the velocity of the medium between detectors or the velocity of sound in the medium, can be determined. It is known that $V_s$ is $\gg$ than $V_m$ and that $V_m$ is produced by the subtraction of two large quantities. This is generally considered to be an unfavorable condition for computation.

The Doppler principle operates on the basis of frequency shift and provides a method of measuring $V_m$ directly with a high degree of accuracy. The observed frequency ($f_2$) at the acoustic detector element may be represented by the following equation, $$f_2 = f_1 + f_1 \frac{(V_m)}{V_s}$$

and if $\Delta f = f_2 - f_1$, the equation can be shortened to, $$\Delta f = f_1 \frac{(V_m)}{V_s}$$

the two frequencies $f_1$, representing the signal at the source element, and $f_2$ can be easily measured with digital pulse counters and further processed to solve the above equations.

It is necessary to make some velocity measurement as previously indicated in connection with the simple tubular assembly equatoins. If either of the velocities, $V_m$ or $V_s$, is measured, the other one can be determined by using the above equations. $V_s$ can be measured with considerable accuracy by the common "sing-around" velocity meter based upon the Doppler shift in frequency and described in considerable detail in the patent to Brown et al., No. 3,290,934 for an Acoustic Fluid Metering Device. The velocity meter provides a means for measuring $V_s$ with accuracy within the limits required by systems described herein. As a result, the above equation can be re-written in terms of a solution for the velocity of the medium, $$V_m = V_s \frac{(\Delta f)}{f_1}$$

$V_m$ can, therefore, be derived for any acoustic path between elements. The relationship between the parameters in the above equation is independent of the source to detector separation except that the quantity being measured, ($V_m$), should remain constant during the interval of the measurement. Otherwise, an average velocity would be indicated. The quantities $\Delta f$ and $f_1$ are measured over the same elapsed time interval. By increasing the counting period the two quantities can be measured with improved accuracy.

The invention described herein provides a means for solving the above equation using an array of three sensors comprising a directivity triad. Three separate and identical (theoretically) values for $V_m$ can be measured with a high degree of accuracy. The description is described in terms of measuring the field vector of an ocean current in a three dimensional plane. The system includes digital techniques for improving communicability with future data processing systems.

A search of classes 73/194A; 235/189; and 324/70E was conducted prior to preparation of this application. The Brown patent previously referenced was disclosed by the search.

The related systems indicated by the search can be described by reference to a patent to Kritz, No. 2,826,192, which teaches an acoustic velocity measuring system for determining the velocity, etc. of currents in a fluid by measuring the phase change in signals between sensors (in a simple tubular assembly) caused by the physical state of the fluid. Phase shift is determined by transmitting a signal having a frequency $f_1$ from one transducer to another transducer. The transmitted frequency is adjusted to take into account a change in phase of the received frequency due to the state of the fluid. The receiver is actuated to transmit a signal having a frequency $f_2$ to the first transducer. The frequency is adjusted to take into account a change in phase of the received frequency due to the state of the fluid in the opposite direction.

The two frequencies are added and subtracted by, for example, a heterodyne converter. The added and subtracted signals are processed further to determine the velocity of the fluid.

Basically, the Kritz system is an analog system. As a result, noise may prevent detection of output signals as accurately as is required by most systems of this type. Similarly, because Kritz uses a phase-shift scheme instead of a frequency difference scheme, errors may be introduced due to even slight change in spacing between sensor elements and due to slight variations in the frequencies.

A fixed frequency scheme, in which the frequency difference is determined by digital techniques is believed to be relatively more accurate. Differences due to frequency variations are minimized. Noise effects are reduced because of the use of digital signals as compared with the use of analog signals. As a further advantage of using a fixed frequency and digital system, cycles of signals can be counted over an interval of time, compared, and subtracted for obtaining the difference in frequency due to the state or character of a fluid such as the ocean.

Kritz teaches a plurality of spaced transducers but does not teach such a spacing and orientation as would be desirable in permitting the determination of a field vector indicating the direction of velocity of ocean currents in a three dimensional space.

Patent No. 2,908,888 to Kirkland teaches a Doppler principle system used in determining the velocity of a vessel relative to the velocity of a medium in which the vessel is being propelled. Velocity is integrated to determine the distance traveled. However, as previously indicated, no art was disclosed which anticipates the inventive concepts of the present systems.

SUMMARY OF THE INVENTION

Briefly, the invention comprises a plurality of spaced sensor elements for measuring the direction and velocity of currents in a liquid medium in the planes formed by the plurality of sensor elements. Each sensor includes transmitter means for transmitting acoustic energy at a frequency, $f_1$, to receivers on the other sensors. The transmitters are selectively energized so that measurements made are related to a particular plane.

Data processing means are connected to the sensors for generating digital signals representing the acoustic energy signals. The difference between the frequency of the transmitted energy, $f_1$, and the frequency of the received energy, $f_2$, within each plane is computed. The measured difference is an indication of the effect of the ocean current on the transmitted energy. Field vectors representing the direction and velocity of ocean current are computed from the difference signals. In one embodiment three sensor elements are used for computing a vector representation of the direction of the ocean currents in an $x, y, z$ plane. The same information is used to compute the absolute velocity of the medium.

Reference means are disposed within the sensor array area for providing an indication of the orientation and departure of the array from a horizontal plane and an azimuth reference. The computed vectors are then referenced to an angle as a function of signals generated by the reference means.

Therefore, it is an object of this invention to provide an improved system for measuring the direction and velocity of a liquid medium.

Still another object of this invention is to provide a system for measuring the direction and velocity of ocean currents by processing digital signals representing the effect of ocean current on the frequency of signals transmitted between sensor elements of the system immersed in the ocean.

Still another object of this invention is to provide an improved system for measuring the direction of ocean currents in a three dimensional space by comparing the frequency of acoustic energy through the ocean current with a reference frequency.

Still another object of this invention is to provide a system for measuring the direction and velocity of ocean currents by using a plurality of sensing elements and by computing the difference in the frequency of a signal transmitted between elements.

Another object of this invention is to provide a method and system for measuring the effect ocean currents have on the frequency of signals transmitted in planes between a plurality of sensors immersed in the ocean.

These and other objects of this invention will become more apparent in connection with the following drawings.

DESCRIPTION OF PREFERRED EMBODIMENT

Figure 1:
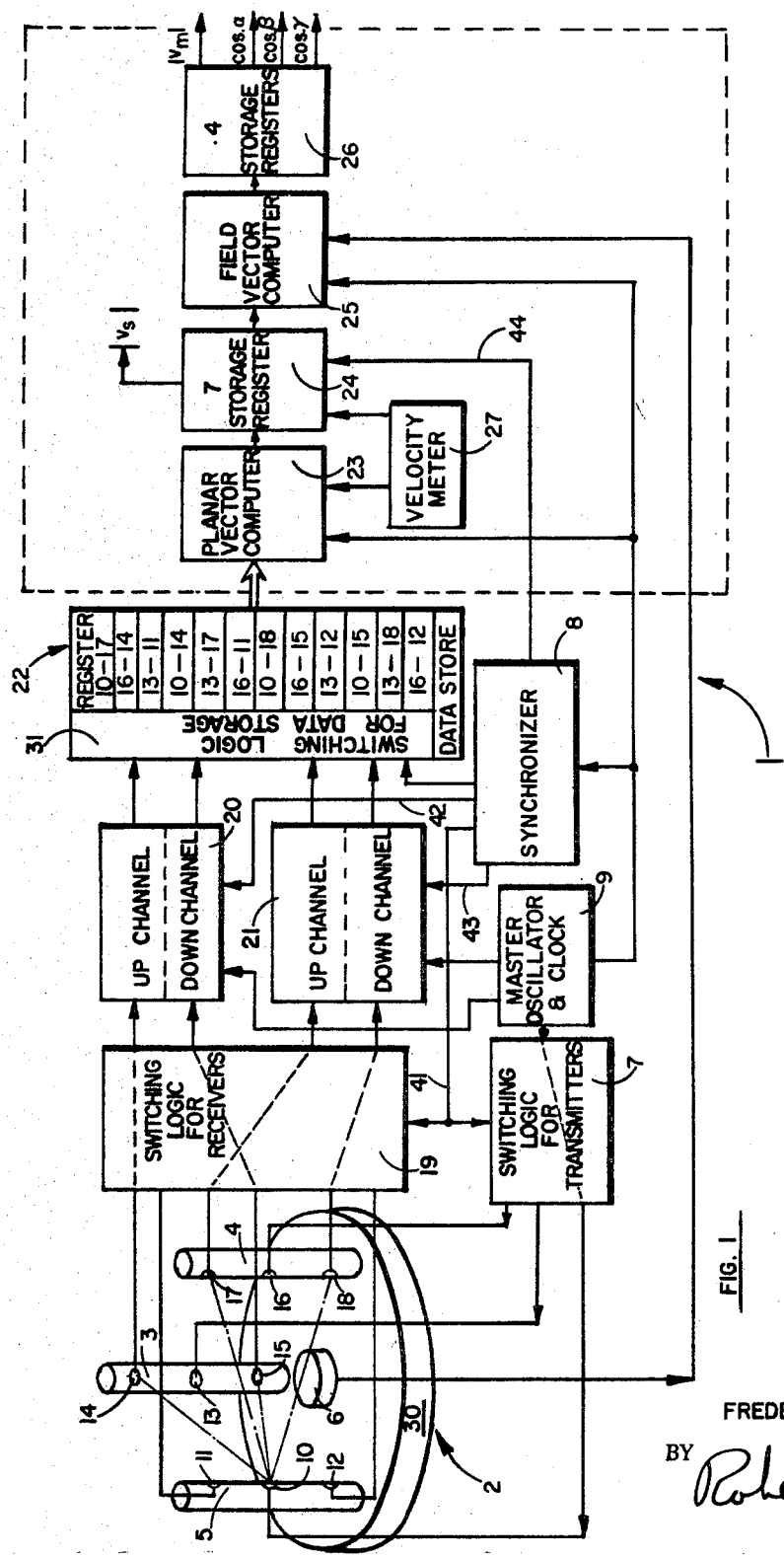
FIGURE 1 illustrates a system for measuring the direction and velocity of ocean currents.

FIGURE 1 illustrates system 1 for measuring direction and velocity of current in a liquid medium such as the ocean. The system may be used in other mediums. The portion of the system enclosed by the dotted line comprises the portion of the system not necessarily disposed within the ocean, except for the velocity meter which is included within the dotted line area for convenience in illustration. It may be located for example, on board a floating vehicle. The remaining portions are immersed within the ocean. In other embodiments, the arrangement may be modified.

The system includes sensor array 2 comprising sensor elements 3, 4 and 5 vertically disposed on base 30. The sensor elements are displaced symmetrically 120° apart with respect to their sensing axis. Each sensor includes receiver and transmitter means. For example, sensor 3 includes transmitter means 13 centrally disposed between receiver means 14 and 15. Sensor 4 includes similarly located transmitter means 16 and receiver means 17 and 18. Sensor 5 includes also transmitter means 10 and receiver means 11 and 12. In effect, the transmitters are omni-directional devices with respect to the other sensors.

Transmitters and receivers may be piezolectric devices well known to those skilled in the art. One example may comprise ceramic elements which vibrate in response to applied electrical signals for generating acoustic signals.

The sensor elements may be hollow cylinders having diameters $d$ and filled with, for example, oil for equalizing the hydrostatic pressure. The elements may be approximately eight inches high and may be separated from other elements by twelve inches. The size, spacing and other physical characteristics may be changed in different embodiments. The sensor element, as well as other elements of the system submerged in the ocean, should be comprised of a highly corrosive resistant material such as stainless steel, etc.

Disposed within the array and located at the approximate center of the base, is pendulous, magnetic and gravity field detector means 6 for providing a reference for the array. The detector may be comprised of a compass for giving a basic horizontal reference and a bubble level indicator for providing a vertical reference. Pickup means are provided for generating signals through the remaining portion of the system for indicating the position of the level and the compass.

Each transmitter of the sensor element is connected to receive signals through switching logic 7 which may be comprised of a plurality of AND gates for selectively energizing and de-energizing transmitters of the sensor array. The logic gates control switching of the transmitting transducers 10, 13 and 16 in proper order. It is controlled by signals from synchronizer 8 and master oscilator (clock) 9. All functions of the system are synchronized by the synchronizer which may contain a number of counters for performing various switching functions that are required during system operation. The sequencer is "slaved" to the master oscilaltor that serves the dual function of clock and source of acoustic energy which is propagated through the fluid medium.

The master oscillator provides clock, or time reference, signals to various portions of the system when a synchronizer signal is present. For example, a gate in logic 7 may be turned on when the clock and synchronizer signals are true for gating the acoustic signal to a selected transmitter.

Details on the counters as well as on the oscillator are not included, inasmuch as such details are considered to be well known to persons skilled in the art. For example, one unable counter may comprise a binary counter which increases its count by one for each interval until a maximum is reached. The oscillator may be a flip flop, crystal, or other oscillator circuit capable of providing a signal at a desired frequency and amplitude for driving the transmitters. For example, in one embodiment a signal of 500 kilocycles may be used. By properly selecting the frequency, an output register may be provided for reading the velocity of the medium directly in feet per second. Using the following equation the above frequency can be verified for a set of fixed conditions.

$$V_m = V_s \frac{(\Delta f)}{f_1}$$

where $V_s$ is equal to 5000 feet per second; $\Delta f$ is equal to 1 cycle per second; and an accuracy of 0.01 feet per second per cycle is required, $f_1$ is calculated as 500 kc.

$$f_1 = \frac{5000}{.01} = 500 \text{ kc.}$$

The receivers on the sensors are connected to switching logic 19 comprised of gates which are also controlled by the synchronizer. Logic 19 may be mechanized by a plurality of AND gates for properly connecting the acoustic signals to the up/down counting circuits 20 and 21.

Signals from logic 19 are connected to up channel/down channel circuitry 20 and 21. The circuitry may comprise computer means for counting the cycles of signals received from logic 19 and from clock 9 over an interval of time. The synchronizer controls switching logic 7 for the source transducers and switching logic 19 for the receiving transducers through line 41. An exemplary computing sequence is shown in the table described in the following text. Up and down as used herein refers to whether the pickup is above or below the median plane of the array identified as that plane passing through the acoustic center of the three transmitting transducers, 10, 13 and 16.

After a switch from one set of receivers to another is made, a relatively short interval of time elapses until steady state conditions are established. The synchronizer then activates counters in circuitry 20 and 21 by removing inhibit signals to gates in the counter channels. After a specified number of clock cycles (time interval) the sequencer stops the counter means by again generating an inhibit signal. The accumulated count represents the total number of cycles from the receiving transducers. The count is gated into registers in the data storage means 22. The time interval is selected with its relationship to the units of measurement and with regard to the accuracy desired.

The generalized description is summarized by the example shown in the following table:

| (1) Cycle | (2) Sensing element path | (3) Source transducer active | (4) Pick-up transducer to cycle counter 20 | | (5) Pick-up transducer to cycle counter 21 | |
|---|---|---|---|---|---|---|
| | | | Up | Down | Up | Down |
| 1 | 5-4 | 10 | | | 17 | 18 |
| 2 | 4-5 | 16 | 11 | 12 | | |
| 2 | 4-3 | 16 | | | 14 | 15 |
| 3 | 3-4 | 13 | 17 | 18 | | |
| 3 | 3-5 | 13 | | | 11 | 12 |
| 1 | 5-3 | 10 | 14 | 15 | | |

The cycles identified in column 1 correspond to the operations involving the activation of a source transducer (column 3) and the excitation of receiving transducers for processing through cycle counter 20 and 21 as shown in columns 4 and 5. The sensing path as indicated in column 2 for cycle 1 is between sensors 5 and 4. The table shows that there are three cycles although each cycle is repeated so that acoustic energy is transferred from the transmitter on one sensor to the receiving transducer on the other sensor and vice versa.

For example, during cycle 1 at $t_1$ time, source transducer 10 may be excited and pickup transducers 14 and 15 connected to up and down cycle counters respectively of 20, while at the same time pickup transducers 17 and 18 would be connected to up and down cycle counters respectively of 21 so that measurements would be made in the planes 5-4 and 5-3 simultaneously. The synchronizer permits the channel circuitry to be time shared by all the sensors. Otherwise, it would be necessary to provide such circuitry for each plane within the array. In addition, signals of different frequencies would be required for exciting each transmitter and a multitude of selective filters with each receiver.

Data storage means 22 is connected to the channel circuitry and to synchronizer 8. The counts accumulated by the channel circuitry are gated through logic means 31 by signals from synchronizer 8 into selected ones of the indicated registers. Each of the registers of the data storage means is identified with one of the twelve possible propagation paths of the sensor array 2. For example, register (10-17) designates the register for storing the cycles counted of the signal transmitted by transmitter 10 and received by receiver 17.

As soon as all the registers are filled, the information is processed by planar vector computer 23 connected to the storage means 22 of FIGURE 1. The data contained in the twelve registers is up-dated with each complete cycle of switching around the array. After each planar computation (cycle) indicated in the table, the sequencer sets all computer circuits, counters and gates in the system to their proper states for initiating the next period of operation.

Although planar vector computer 23, storage register means 24, field vector computer means 25 and storage register means 26 may be part of a single computer, for this description the system is divided into the functional blocks illustrated.

Planar vector computer means 23 is connected to simultaneously receive signals from each of the registers of storage means 22. The signals are processed and used to compute vector components of ocean current in each plane defined by pairs of sensor elements. The planar vectors are computed relative to base 30 of the sensor array.

Figure 2:
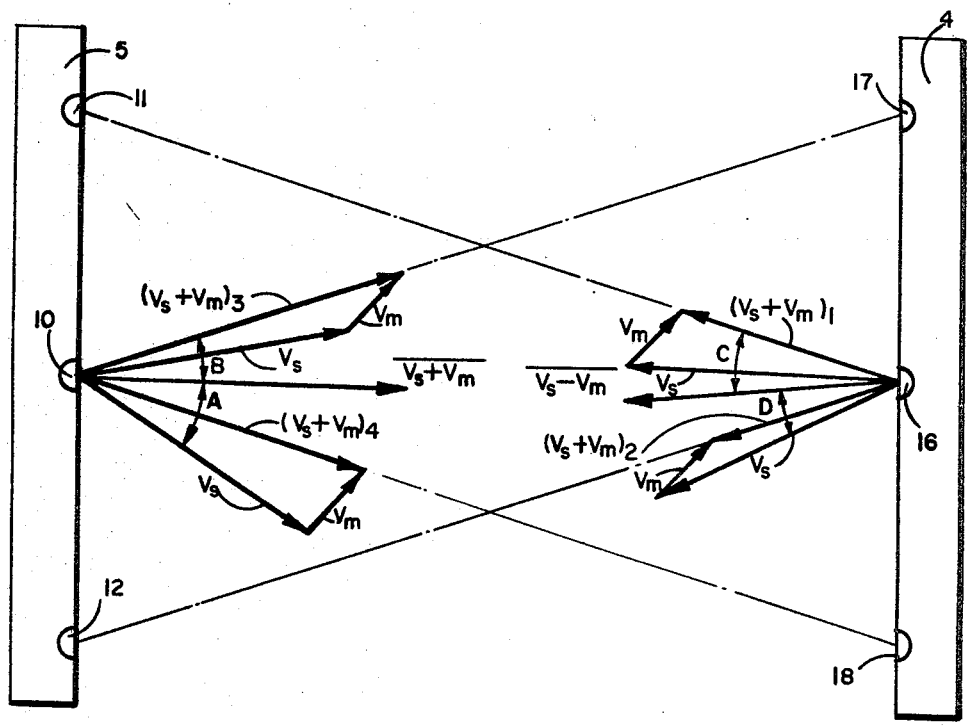
FIGURE 2 illustrates one set of velocity vectors in a plane common to two sensor elements.

For example, in the plane of sensing elements 4 and 5 exemplary vector relationships can be seen by referring to FIGURE 2 for a component of ocean current not parallel with the base 30 of the sensor array. The resultant vectors are always along the lines between geometrically located transducers (i.e., wave fronts having vertical components propagate along paths of shortest distance). As a result it is possible to perform a vector solution. The velocity of propagation between source 10 and receivers 17 and 18 is effected unequally by the velocity of the fluid medium $V_m$, thereby increasing the value of $(V_s+V_m)_3$ and $(V_s+V_m)_4$ unequally. In the opposite direction, the velocity of propagation between source 16 and receivers 11 and 12 is also effected unequally by the velocity of the fluid medium, $V_m$, by decreasing the valve of $(V_s+V_m)_1$ and $(V_s+V_m)_2$ unequally. In the former case, the valve $\overline{V_s+V_m}$ may be shown by the following equation, $$\overline{V_s+V_m} = \frac{(V_s+V_m)_3 \angle A + (V_s+V_m)_4 \angle B}{2}$$

and the latter case for $\overline{V_s-V_m}$ by the equation, $$\overline{V_s-V_m} = \frac{(V_s+V_m)_1 \angle C + (V_s+V_m)_2 \angle D}{2}$$

The values of $\overline{V_s+V_m}$ and $\overline{V_s-V_m}$ as determined from the above equation may be used with the $V_s$ input from meter 27 to derive $\overline{V_m}$ for the selected plane. The operation is repeated by computer 23 for each plane.

By establishing symmetrical geometry the angles A, B, C and D are identical, thus simplifying the computation. The computation yields one value for each propagation path between sensor which may be resolved into horizontal and vertical components relative to the base. Since frequency counting is used to measure relative velocity in the count accumulated, for example, at receiver 17 due to emission from transmitter 10, will be greater than the count accumulated at receiver 18. The difference between these two counts is a direct relationship to the vertical component of the velocity vector for acoustic propagation from left to right in FIGURE 2. Likewise, the sum of the two counts is related to the left to right horizontal component of the velocity vector. If $n$ represents the number of cycles counted, the vertical component of ocean current in the plane of sensor elements 5 to 4 may be calculated by, $$(V_m)_v = V_s \frac{(n_{17} - n_{18})}{n_c}$$

where $n_c$ is the number of cycles of clock frequency in the time interval represented by $n_{17}$ and $n_{18}$. The corresponding horizontal component may be calculated by, $$(V_m)_h = V_s \frac{(n_{17} + n_{18})}{n_c}$$

The current vector in the 5–4 plane may be computed by using the above values and known trigonometric relationship by, $$\theta = \tan^{-1} \frac{(V_m)_v}{(V_m)_h}$$

$$|V_m| = (V_m)_h / \cos \theta$$

For propagation of sound in the opposite direction (right to left; sensor element 4 and 5) equivalent computations yield the following relationships, $$(V_m)_v = V_s \frac{(n_{11} - n_{12})}{n_c}$$

$$(V_m)_h = V_s \frac{(n_{11} = n_{12})}{n_c}$$

$$\theta = \tan^{-2} \frac{(V_m)_v}{(V_m)_h}$$

$$|V_m| = (V_m)_h / \cos \theta$$

Although the above mode of operation is preferred, it is possible for computer 23 to make the same calculations using a different scheme. Six different acoustic frequencies may be transmitted simultaneously between sensors. Appropriate filters, for example, could be provided on the receivers for permitting continuous operation of all elements. Time sharing of common circuits as shown in FIGURE 1 is preferred to the plurality of frequency approach because less hardware is involved and more flexibility is permitted in selecting an acoustic frequency which may be beneficial in calibrating the output data. The propagation data is derived by switching successively from one sensor element to another in the planes of element pairs, progressing around the array in a cyclic manner. For example, one transmitting element switching order might be, (5–4) (4–5) (4–3) (3–4) (3–5) (5–3)

as illustrated in the previously described table, where the sensing elements are identified for convenience. Signals detected by the appropriate receiving elements are gated through logic 19 into the counters of the up/down channel circuitry in a synchronous manner. The transmitter elements remain in the excitation mode a period of time required for an accurate count to be made by the up/down channel circuitry connected to the sensing element receiver pairs.

Solution of equations for $\theta$ and $|V_m|$ may not be required since the planar data is not of particular interest in the usual case to the ocean scientist. It is probable that the velocity components $(V_m)_v$ and $(V_m)_h$ may be utilized directly by the field vector computer that will follow.

Planar vector computer 23 is connected to selectively receive data from the twelve registers as required for computing the quantities $(V_m)_v$, $(V_m)_h$, $\theta$, and $|V_m|$ in accordance with previously developed equations and by use of the quantity, $V_s$, from velocity meter 27. The computations are relatively simple operations in the digital computer art. A computer program can be developed for computer 23 for solving the equation. Because of the precise time control exercised by the counter means in sequencer 8, the term $n_c$ in the equations is a constant and consequently, the division operations indicated can be performed as a scaling operation on $V_s$.

Storage means 24, comprising seven storage registers, is connected to the planar vector computer for storing the scalar quantities computed. The quantities $(V_m)_v$ and $(V_m)_h$ from the equations are redundant with the quantities $\theta$ and $|V_m|$ from the other equations so that either one set of data or the other could be stored in the registers. Each register comprises a capacity of sufficient length to store both components of the current vector in one direction of one of the three planes in either rectangular or polar coordinates as may be most suitable for computation by field vector computer 25. The seventh register in the block 24 is for the purpose of storing the frequency output of the "sing-around" velocity meter 27 as a binary word. The conversion is accomplished by means of one of the conventional digital counters such as a Johnson counter under the control of the synchronizers through line 44.

Figure 3:
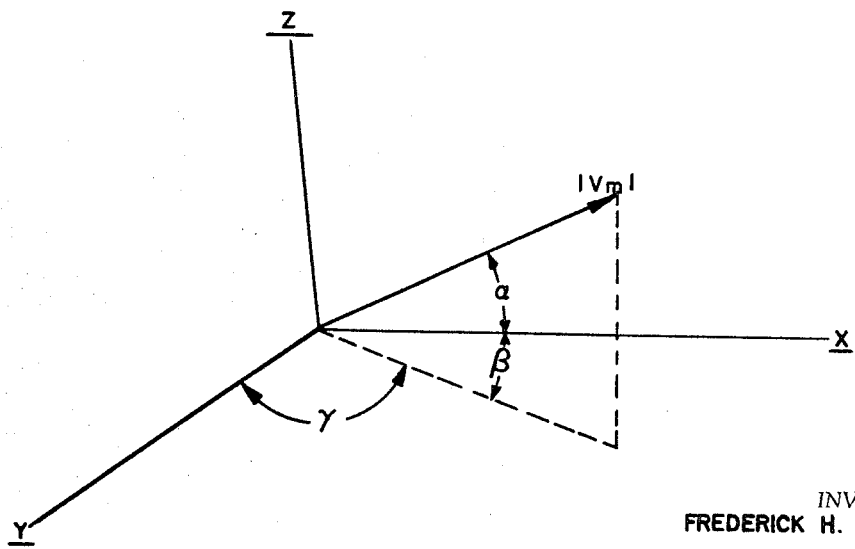
FIGURE 3 illustrates a resultant vector directed at an angle in an $s, y, z$ plane.

Information from the register 24 is used in the field vector computer means 25 for computing the field vector in a three dimensional space. The field vector includes an input from detector 6 for referencing planar vectors to an absolute vertical and azimuth reference. The resulting field vector $|V_m|$ is referenced by direction cosines of angles $\alpha$, $\beta$ and $\gamma$ as shown in FIGURE 3.

If the central array could be stabilized in the fluid medium by means of weights to hold some reference attitude with respect to the vertical, the complications introduced into the field vector computer for providing the resolution into a universal reference frame could be considerably simplified. With a proper anchor, and buoy design, it would not be difficult to maintain a fixed reference attitude. In fact, if the hydrodynamic characteristics of the array, relating attitude to direction and magnitude of ocean currents were known (by calibration) they could be mechanized in the computer means and the vector computer could be corrected by implicit computational techniques, thus eliminating the need for precise vertical standard. If the application of the instrument were such that only interest in the horizontal current vector was required, or if it were known beforehand that the current had essentially no vertical component, the array could be simplified to consist of only one transducer at each vertex of the triangular configuration. Each transducer could be used alternately for transmitting or sensing of acoustic energy under the control of the switching logic. The computer would also be considerably simplified under those restricted conditions.

The field vector computer converts the planar vector data from the planes defined by the sensor array into a single vector defined by a magnitude and three direction cosines related to a reference such as magnetic north and the local gravity vector. The data computed is referenced to the plane of the base and is a function of the geometric configuration of the sensor element. The computer can be programmed to properly convert the data. In one program the vector may be computed by mathematically projecting the real field vector normal into each plane of the sensor array. The vector component is the only component that the sensors are able to detect.

If a Cartesian coordinate frame is superimposed upon the isometric array in such a manner that the origin coincides with sensing element 5 and the $x$–$z$ plane is the same as the plane defined by sensing elements 5–4, a simple geometric projection may be performed by the computer, since one plane of each coordinate frame is common. The field vector would be reconstructed as that vector whose normal projection on the 5–4 and 5–3 planes are the vectors measured and stored in the planar vector computer 23. The field vector would then be projected onto the $y$–$z$ plane of the orthogonal frame to provide the equivalent planar vectors in that coordinate system. This provides a transformation of the sensed information into an orthogonal coordinate set related to the sensor array base. The task of further transformation to a coordinate frame based upon the local gravity vector and magnetic north is performed by application of classical coordinate transformation techniques which are common practice in related computer art.

It should be noted that the measurement of the field vector component in two planes of this sensor array simultaneously provide sufficient information for a complete solution of the problem. However, because of some angular relationships, errors are of such a magnitude that poor field vector definition results. It is preferred to perform the solution for each pair of sensor array planes for obtaining vectors of high accuracy for any direction of current flow across the sensor array.

Although the invention has been described and illustrated in detail, it is to be understood that the same is by way of illustration and example only; and is not to be taken by way of limitation; the spirit and scope of this invention being limited only by the terms of the appended claims.

I claim:

1. A system for measuring the direction and velocity of currents through a liquid medium, comprising,
  a plurality of sensor means separated for forming a plurality of planes between the sensor means, each of said sensor means having receiver and transmitter means,
  means for sequentially actuating each transmitter means for propagating acoustic signals from the actuated transmitter means through the medium to receivers on others of said sensor means in each of the planes,
  means for computing the difference between the frequency of the signals received by the receiver means and transmitted signals,
  means responsive to said difference for computing a vector indicating the direction and velocity of currents in said liquid medium.

2. The combination as recited in claim 1, wherein said sensor means comprises three vertically disposed sensors spaced 120° apart for forming three planes, said means for computing comprises means for generating digital signals representing planar vectors in each of the planes and said means responsive includes means for combining said planar vectors into a field vector representing the velocity and direction of said currents in a three dimensional space.

3. The combination as recited in claim 1, wherein said means for computing, said means for actuating, and means responsive are used sequentially for processing digital data representing signals propagated in each of said planes.

4. The combination as recited in claim 1, including means for sequentially actuating selected ones of said transmitters and for sequentially processing signals propagated between transmitters and receivers in a selected plane before other transmitters are actuated,
  said means further including means for actuating each transmitter in sequence until all received signals are processed.

5. The combination as recited in claim 4, wherein said means for processing includes means for counting the cycles of said received signals over a fixed interval of time and for measuring the velocity of sound in the medium as a quantity scaled as a function of said count whereby said scaled velocity quantity can be used for computing the direction and velocity of said currents.

6. The combination as recited in claim 1, including means for sequentially actuating selected ones of said transmitters and for sequentially processing signals propagated between transmitters and receivers in a selected plane before other transmitters are actuated,
  said means further including means for actuating each transmitter in sequence until all received signals are processed,
  and wherein said signals are transmitted at a fixed frequency.

7. The combination as recited in claim 1, wherein each of said sensor means has one transmitter interposed between two receiver means whereby signals transmitted by other transmitters are received by the two receivers.

8. The combination as recited in claim 1, including means for sequentially actuating each of said transmitters and for sequentially processing signals propagated between each transmitter and the receiving means receiving said signals before another transmitter is actuated,
  said means further including means for actuating each transmitter in sequence until all received signals are processed,
  said means for computing including digital counter means for counting the cycles of the received signals and transmitted signals over a predetermined interval and for subtracting the cycles for determining the difference in frequency between the transmitted and received signals,
  said means responsive includes means for storing said difference and for using said difference to compute a field vector indicating the direction and velocity of currents through said medium.

9. The combination as recited in claim 8, including means providing an orientation reference for said sensor means with respect to a fixed reference whereby said field vector is oriented to said fixed reference and wherein said medium is ocean water.

10. A system for measuring the direction and velocity of currents through a liquid medium comprising,
  a plurality of sensor means each including receiver means and means for propagating signals to receiver means associated with the other sensor means,
  means for selectively actuating said propagation means for propagating signals from the actuated means through the medium to receivers on others of said sensor means, means for computing the difference between the frequency of the propagated signal and the frequency of the received signal, wherein said means for computing the difference comprises digital counter means for counting cycles of said signals received over a fixed interval of time including means for storing the count of said cycles for each propagation path, and means responsive to the individual counts for computing quantities representing the magnitude of the current in the medium directed at an angle in a three dimensional space.

References Cited

UNITED STATES PATENTS

| | | |
|---|---|---|
| 2,826,912 | 3/1958 | Kritz. |
| 2,928,277 | 3/1960 | Cavanagh et al. _ _ _ _ _ 73—189 X |
| 3,246,514 | 4/1966 | Gremlitz et al. _ _ _ _ _ _ _ 73—189 |
| 3,336,801 | 8/1967 | Snavely _ _ _ _ _ _ _ _ _ _ _ _ _ 73—189 |

RICHARD C. QUEISSER, *Primary Examiner.*

JERRY W. MYRACLE, *Assistant Examiner.*

U.S. Cl. X.R.

181—.5